(12) United States Patent
Cullen

(10) Patent No.: US 6,955,030 B2
(45) Date of Patent: *Oct. 18, 2005

(54) ADJUSTABLE DENSITY CONTROLLER FOR A BAGGING MACHINE

(75) Inventor: Steven R. Cullen, Astoria, OR (US)

(73) Assignee: SRC Innovations, LLC, Astoria, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/867,593

(22) Filed: Jun. 14, 2004

(65) Prior Publication Data

US 2005/0016132 A1 Jan. 27, 2005

Related U.S. Application Data

(63) Continuation-in-part of application No. 10/417,444, filed on Apr. 16, 2003, now Pat. No. 6,748,724.

(51) Int. Cl.[7] .................................................. A65B 1/24
(52) U.S. Cl. .......................... 53/469; 53/527; 53/567; 53/576
(58) Field of Search ........................ 53/436, 459, 469, 53/527, 567, 576

(56) References Cited

U.S. PATENT DOCUMENTS

| 3,687,061 | A | | 8/1972 | Eggenmuller et al. | |
| 4,046,068 | A | | 9/1977 | Eggenmuller et al. | |
| 4,337,805 | A | * | 7/1982 | Johnson et al. | 53/576 |
| RE31,810 | E | | 1/1985 | Lee | |
| 4,599,764 | A | * | 7/1986 | Knepshield | 452/38 |
| 4,606,176 | A | * | 8/1986 | Cundall | 53/567 |
| 4,621,666 | A | | 11/1986 | Ryan | |
| 5,067,313 | A | * | 11/1991 | Evans | 53/576 |
| 5,297,377 | A | | 3/1994 | Cullen | |
| 5,425,220 | A | | 6/1995 | Cullen | |
| 5,463,849 | A | | 11/1995 | Cullen | |
| 5,464,049 | A | | 11/1995 | Cullen | |
| 5,517,806 | A | | 5/1996 | Cullen | |
| 5,661,956 | A | * | 9/1997 | Tardif | 53/588 |
| 5,671,594 | A | | 9/1997 | Cullen | |
| 5,775,069 | A | | 7/1998 | Cullen | |
| 5,857,313 | A | | 1/1999 | Cullen | |
| 5,894,713 | A | | 4/1999 | Cullen | |
| 5,899,247 | A | | 5/1999 | Cullen | |
| 5,960,612 | A | | 10/1999 | Cullen | |
| 6,202,389 | B1 | * | 3/2001 | Inman et al. | 53/436 |
| 6,430,897 | B1 | | 8/2002 | Cameron et al. | |
| 6,443,194 | B1 | | 9/2002 | Cullen | |
| RE38,020 | E | | 3/2003 | Cullen | |
| 6,655,116 | B2 | | 12/2003 | Cullen | |

* cited by examiner

Primary Examiner—John Sipos
(74) Attorney, Agent, or Firm—Kolisch Hartwell, P.C.

(57) ABSTRACT

A density controller is provided for a bagging machine designed for filling or packing material such as silage, compost or the like into an elongate flexible bag or container. The adjustable density controller comprises a drag member or strap with a selectively adjustable length that is positioned beneath the bag being filled and the ground. The weight of the material in the bag on the flexible member resists the forward movement of the bagging machine away from the closed end of the bag. The density of the material being packed or bagged is varied by the surface area of the flexible member that is positioned beneath the bag being filled.

61 Claims, 4 Drawing Sheets

ADJUSTABLE DENSITY CONTROLLER FOR A BAGGING MACHINE

CROSS-REFERENCE

This is a continuation-in-part application of U.S. patent application Ser. No. 10/417,444 filed on Apr. 16, 2003, entitled "An Adjustable Density Control Means For A Bagging Machine now U.S. Pat. No. 6,748,724." The entire substance of that application is incorporated herein.

FIELD OF THE INVENTION

This disclosure relates to a density controller for a packing machine and more particularly to a density controller for a bagging machine designed to fill or pack material such as silage, compost, or the like into an elongated bag or container.

BACKGROUND

Agricultural feed bagging machines have been employed for several years to fill, pack, or bag silage or the like into elongated plastic bags. In these bagging machines, silage or the like is supplied to the forward or intake end of the bagging machine and is fed to a rotor that conveys the silage into a tunnel on which the bag is positioned so that the bag is filled. As silage is loaded into the bag, the bagging machine moves away from the filled end of the bag in a controlled fashion so as to achieve uniform compaction of the silage material within the bag. In early bagging machines, a backstop structure yieldably engaged the closed end of the agricultural bag to resist the movement of the bagging machine away from the filled end of the agricultural bag as silage is forced into the bag. These machines included a pair of drums rotatably mounted on the bagging machine with a brake associated therewith for braking or resisting the rotation of the drum with a selected brake force. A cable is wrapped around the drum and is connected to the backstop.

In more recent bagging machines, a density control means, which included a plurality of cables, was positioned in the flow of the silage material being bagged. In order to vary the density of the material in the machine, more or less cables would be employed based on the material being packed. For example, corn silage flows easy and would require more cables while alfalfa packs hard and would use less cables. Other arrangements are known in which the density of the material in the bag is controlled by a density control means positioned in the path of the material being bagged.

SUMMARY

A bagging machine is disclosed for packing or filling material such as silage, compost, or the like into a container having a closed end and an open end. The bagging machine comprises a movable frame having a rearward end and a forward end. A material-forming enclosure or tunnel has an intake end coupled to the rearward end of the movable frame and configured to receive the material to be bagged. The material-forming enclosure also has an output end extending rearwardly away from the movable frame and configured to receive the container. A material-filling or packing apparatus is coupled to the frame which moves the material to be bagged rearwardly into the material-forming enclosure and into the bag. At least one drag member or strap may be mounted to the packing machine to extend rearwardly with respect to the frame between the material being packed and the ground to resist forward movement of the bagging machine.

The drag member or strap may have a fixed member length and an adjustable extended length. The extended length being understood to be the length of the drag member positioned between the packed material and the ground surface. The extended length of the drag member may be adjusted in a variety of manners to be described herein.

When coupled to the machine, the drag member has an upper surface and a lower surface. The upper surface may be disposed in facing relationship with the packed material and the lower surface may be in facing relationship with a ground surface. The lower surface may be configured to smooth the ground surface beneath the packed material over which the drag member passes as the packing machine moves forward. The drag member may also cause the bag to be stretched, increasing the bag's effective length and reducing wrinkles. Additionally, the top surface of the drag member may be configured to guide the container as the packing machine moves forward. The drag member may also be utilized to position a folded bag onto the material-forming enclosure.

DETAILED DESCRIPTION

Figure 1:
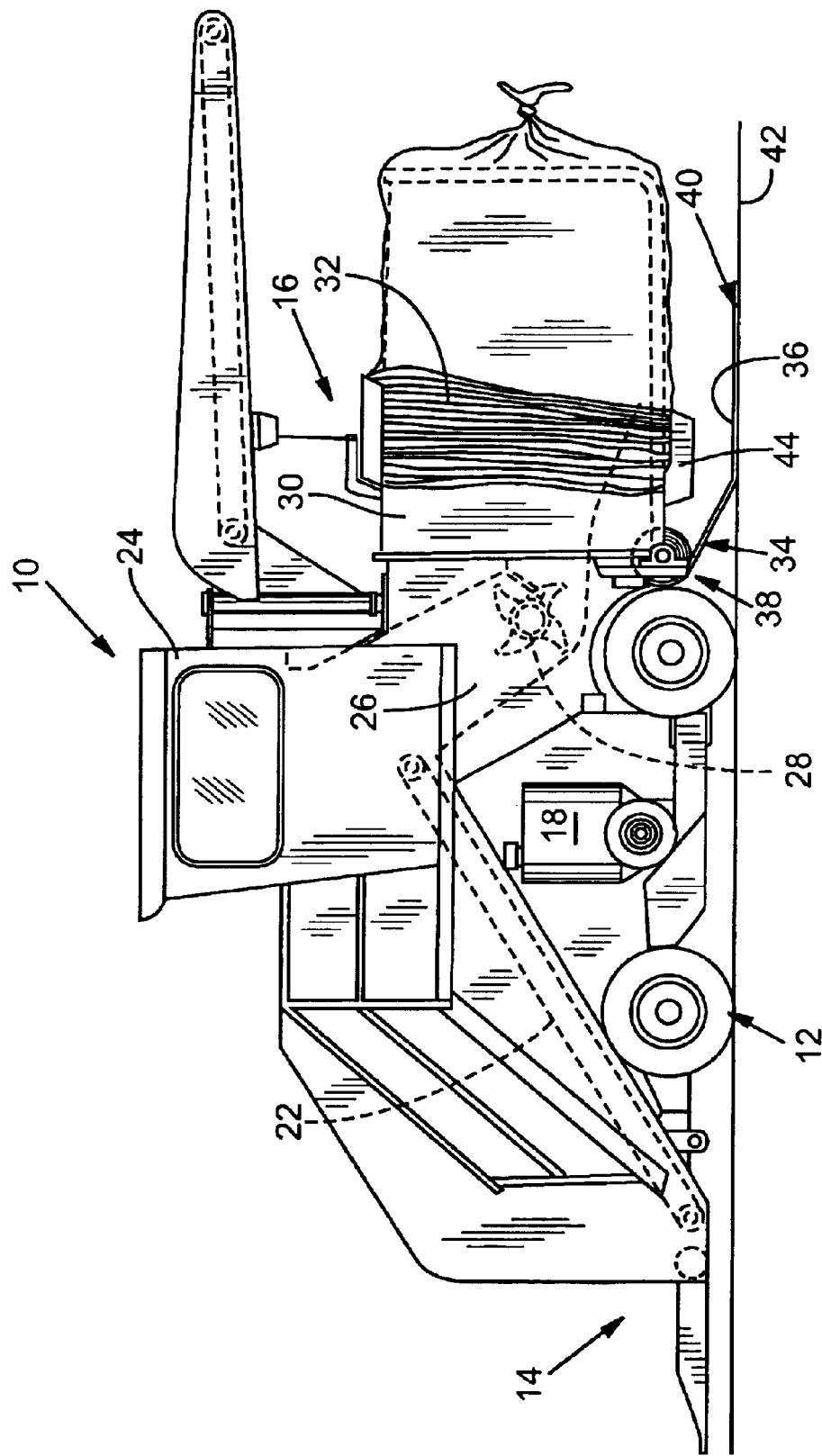
FIG. 1 is a side view of a packing machine having an adjustable density controller coupled thereto.

FIG. 1 illustrates a packing or bagging machine referred to generally by the reference numeral 10. Machine 10 includes a movable frame 12 having a forward end 14 and a rearward end 16. Machine 10 may also include wheels and an engine 18 for driving machine 10 and the components thereof. The machine 10 may also be configured to be pulled by a tractor with the power take-off thereof being utilized to power the components of the machine.

Machine 10 also includes an inclined feed table 22. Machine 10 further includes an operator's cab 24, a hopper 26, a material-filling apparatus 28, shown here in the form of a rotor, and a material-forming enclosure or tunnel 30. The filling apparatus 28 could be in the form of a plunger, screw conveyor, packing fingers, or other apparatus known in the art. One or more horizontally spaced-apart bag retainers 44 may be provided on the material-forming enclosure 30. The retainers 44 are designed to limit the bag 32 from being pulled rearwardly from the enclosure 30 during the filling of the bag.

Figure 2:
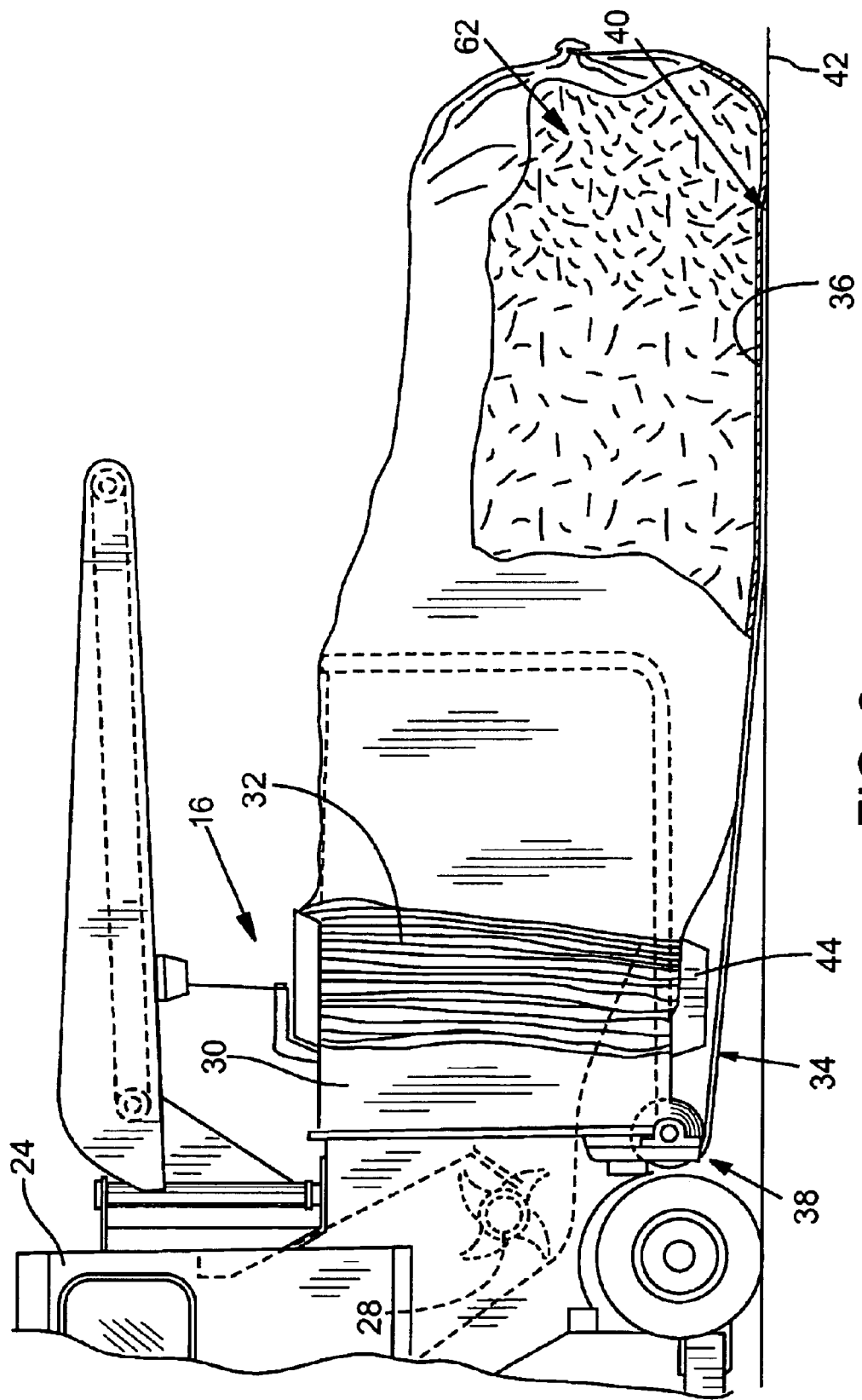
FIG. 2 is a side view illustrating an adjustable density controller being used.
Figure 3:
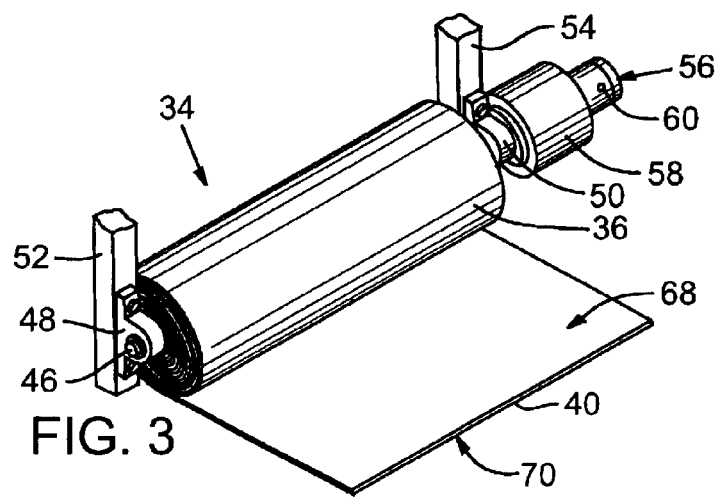
FIG. 3 is a rear perspective view of an embodiment of an adjustable density controller configured to be coupled to the bagging machine.

With reference to FIGS. 1–3, the numeral 32 refers to a flexible bag or container into which material is filled, bagged or packed. As used herein, the terms "packing" and "bagging" are used interchangeably and should be understood to refer to the act placing a quantity of material into a bag or other container. The container used in cooperation with the adjustable density controller described herein may be a conventional bag with an opening having a continuous circumference or it may be a flexible container formed by an elongate covering having opposing side edges.

When a flexible, elongate covering is used to form the container, the container may extend partially around or completely around the material being packed to partially or completely enclose the same. The flexible, elongate covering may be formed into a cylindrical or semi-cylindrical shape by tucking the opposing side edges under the packed material. An example of a flexible container partially enclosing the packed material is described in U.S. patent application Ser. No. 10/334,484, filed on 30 Dec. 2002 by Steven R. Cullen, the disclosure of which is incorporated herein by reference. The flexible container may be configured such that the opposing side edges adjacent the material-forming enclosure are tucked between the packed material and the drag member described herein. The flexible container may also be configured such that the opposing side edges remain tucked under the packed material as the packing machine moves away from the closed end of the flexible container. When one or more drag members are utilized, such as described herein, at least a lower portion of the container may be disposed between the packed material and the one or more drag members.

With continued reference to FIGS. 1–3, a density controller is referred to generally by the reference numeral 34. A drag member 36 may be configured to be operatively coupled to packing machine 10. When coupled to machine 10, drag member 36 may be configured to extend rearwardly with respect to the frame, between the bag 32, or the material being packed, and the ground surface 42. For ease of discussion, drag member 36 may be described as having a coupling end 38 operatively mounted to machine 10 and a free end extending rearwardly with respect to frame 12.

Drag member 36 may be constructed of a heavy-duty conveyor belt material such as used in conveying particulate material such as aggregate, sand, etc. Alternatively, the flexible member 36 may be constructed of rubber, plastic, woven material, non-woven material or other material suitable for the purposes described herein. Drag member 36 may be of any thickness; however, convenience and weight considerations may favor a thinner construction. Additional features of drag member 36 are discussed below.

In some embodiments, drag member 36 may be considered to have a fixed member length and an adjustable extended length. In these embodiments, the density controller of the present disclosure becomes an adjustable density controller. The extended length of drag member 36 may be understood to mean the length of drag member 36 disposed between the packed material and the ground surface. The extended length may be adjusted through the use of a variety of devices and mechanisms. For example, drag member 36 may be configured to couple to machine 10 via chains between machine 10 and drag member 36. The extended length of drag member 36 may be adjusted by coupling the chains to different locations on drag member 36, by coupling the chains to different locations on machine 10, or by changing the length of the chain between machine 10 and drag member 36.

One embodiment of an adjustable density controller 34 is shown in FIG. 3 where drag member 36 is coupled to a rotatable winch. A rotatable member such as a winch shaft 46 has its ends rotatably mounted in bearings 48 and 50 which are secured to support members 52 and 54. A power means 56 is provided for selectively rotating the shaft 46 in either a clockwise or counterclockwise direction as viewed in FIG. 3. The power means is preferably a hydraulic motor and a planetary gear drive mechanism 58 of conventional design although other types of motors and gear drives could be utilized. A gauge 60 may be operatively connected to the hydraulic motor 56 to provide an indication (measurement) of the hydraulic pressure within the hydraulic circuit of the hydraulic motor 56 for a purpose to be described hereinafter.

Adjustable density controller 34 may include a drag member 36 operatively coupled to the movable frame 12, the material-forming enclosure 30, or any other component of the packing machine 10. The operative coupling of drag member 36 may be via a mechanically variable adjustment device secured to a component of the packing machine 10, via manually variable adjustment devices, such as chains, between drag member 36 and a component of the packing machine, or via other conventional coupling methods. A mechanically variable adjustment device may include a winch and motor as shown in FIG. 3 or it may include other devices such as a hydraulic cylinder configured to allow more or less of drag member 36 to extend between the packed material and the ground surface.

When density control 34 is configured to include a mechanically variable adjustment device, the adjustable density controller may also be utilized to assist in moving a folded bag 32 forwardly onto the material-forming enclosure or tunnel 30. For example, motor 56 of density controller 34 may be operated to unroll drag member 36 from shaft 46 so that the rearward end 40 thereof is positioned rearward of the rearward end of the material-forming enclosure 30. The upper portion of the bag 32 may then be positioned on material-forming enclosure 30 with the lower portion thereof resting on drag member 36 adjacent the rearward end 40. Motor 56 then may be reversed so that drag member 36 is moved forwardly, such as by being wound upon shaft 46, which causes the lower end of folded bag 32 to be moved forwardly until such time as the bag may be lifted upwardly so that the bag retainers 44 will support the lower end of folded bag 32, as illustrated in FIG. 1. Bag retainers 44 will normally replace the need for a bag pan such as found on most conventional bagging machines.

When it is desired to fill, pack, or bag material into the bag or container 32 on machine 10, the rearward end thereof is closed, such as illustrated in FIG. 1. Density controller 34 may be adjusted or configured so that the rearward end 40 of drag member 36 is positioned rearwardly of the rearward end of the material-forming enclosure or tunnel 30 with bag 32 resting thereupon, as shown in FIGS. 2 and 4.

As material is forced into bag 32 by means of the material-filling apparatus 28, machine 10 will move forwardly with respect to the closed end of the bag. The weight of bag 32 and the material therein resting on drag member 36 will provide resistance to the forward movement of machine 10 away from the filled bag 32. The density of the material may be adjustably controlled by varying the amount of drag material 36 which is under pressure between packed material 62 and ground surface 42. For example, if greater density is desired, a greater amount of the flexible member 36 will be positioned beneath the bag. Without being bound by theory, it is presently believed that the packing density is at least partially dependent of the amount of friction between drag member 36 and ground surface 42. Accordingly, the packing density may be varied by changing the extended length of drag member 36 as discussed above, by changing the width of drag member 36, or by changing characteristics of ground surface 42 or drag member 36 to adjust the coefficient of friction therebetween.

As described earlier in connection with FIG. 3, adjustable density controller 34 may be provided with a rotatable winch shaft 46, a hydraulic motor 56, and a gauge 60. The motor 56, when provided, is configured to unroll drag member 36 when a greater extended length is desired and to roll up drag member 36 when a shorter extended length is desired, but it also is configured to keep drag member 36 from unrolling involuntarily. A back pressure will be exerted on hydraulic motor 56 by drag member 36 as it is being pulled under bag 32 or packed material 62 during the filling process. Gauge 60, when provided, is operatively, fluidly coupled to the hydraulic motor to provide an operator with a measurement of the amount of back pressure exerted on hydraulic motor 56. This measurement can be utilized to determine the packing density achieved for the material being packed. Similar gauges and measurements can be implemented for different types of motors 56 and different types of adjustment mechanisms.

Figure 4:
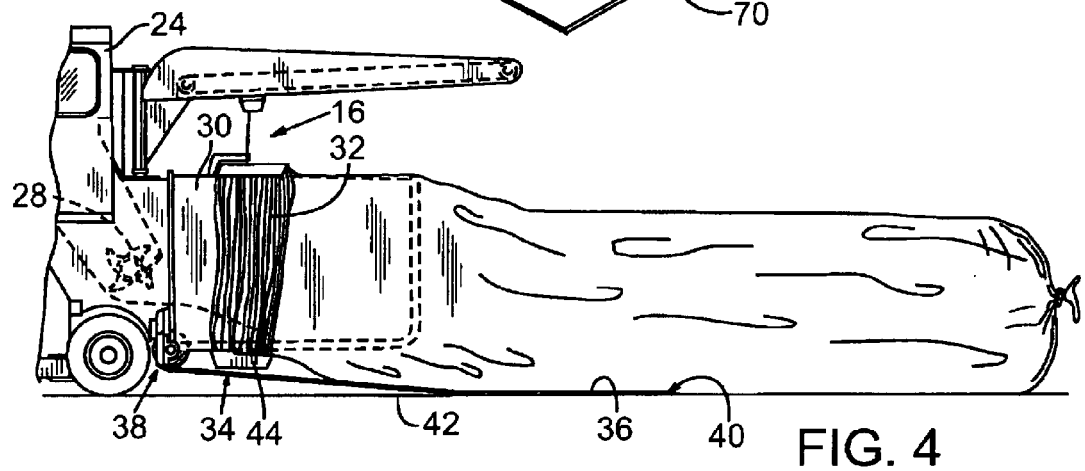
FIG. 4 is a side view illustrating an adjustable density controller being positioned beneath the bag being filled.
Figure 5:
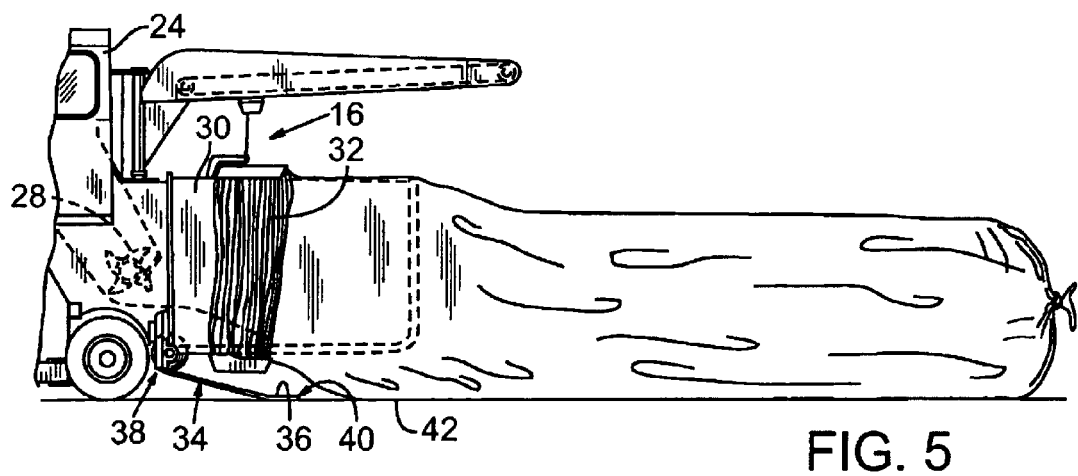
FIG. 5 is a view similar to FIG. 4 but which illustrates the adjustable density control means being removed from beneath the bag.

FIGS. 2, 4, and 5 provide illustrations of one embodiment of an adjustable density controller 34 in different phases of operation. FIG. 2 shows the packing or bagging machine 10 soon after beginning operations. As can be seen, drag member 36 extends rearwardly from packing machine 10 beneath the material being packed 62 and the ground surface 42. As shown here, a lower portion of the bag or container 32 is disposed between packed material 62 and drag member 36.

FIG. 4 shows packing machine 10 at a subsequent time during the operation of the machine. As can be seen, movable frame 12 moves away from the closed end of bag 32 pulling drag member 36 under bag 32 and packed material 62.

FIG. 5 shows the operation of packing machine 10 when the packing operation is concluded. When bag 32 has been completely filled or filled to the desired capacity, material-filling apparatus 28 is inactivated and motor 56 is activated to pull drag member 36 from beneath the bag. It should be appreciated that adjustable density controller 34 may be disengaged from bag 32 without pulling any material from within the bag such as may occur when density control cables, anchors, etc., are utilized within the material being bagged. Adjustable density controller 34 may also pull drag member 36 from beneath the bag or packed material prior to completing operations such as when the resistance to forward movement inadvertently becomes so great that packing machine 10 is unable to move forward.

Figure 6:
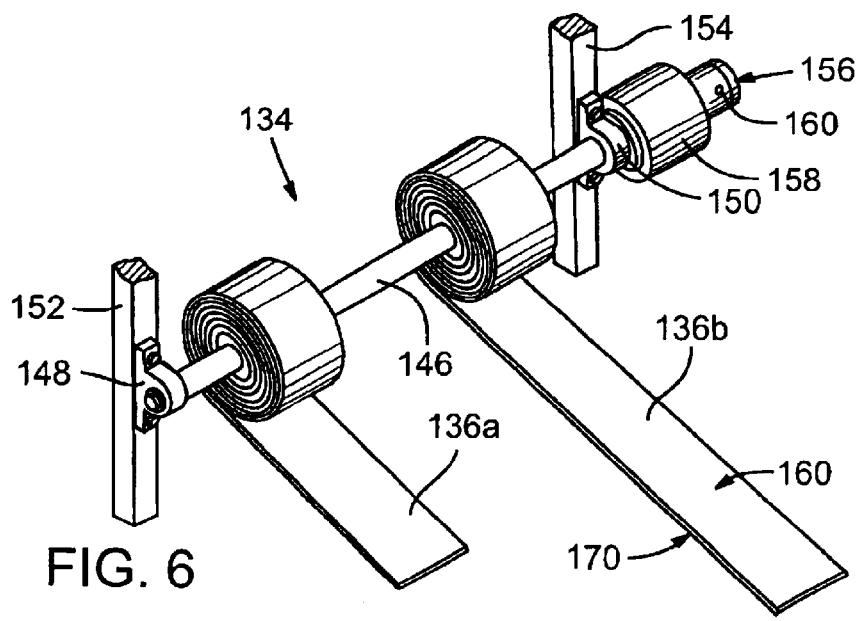
FIG. 6 is a rear perspective view of an alternative adjustable density controller having a plurality of straps.

With reference to FIG. 6, an alternative configuration of adjustable density controller 134 may comprise more than one drag member. Adjustable density controller 134 may include two drag straps 136a, 136b as shown and may include more than two straps. The plurality of drag straps 136a, 136b may be operatively coupled to the packing machine in any of the manners described above for drag member 36 or they may be coupled to rotatable shaft 146 of the winch assembly as shown in FIG. 6. Adjustable density controller 134 operates in a manner similar to the operation of adjustable density controller 34 discussed above in relation to FIGS. 1–5.

Additionally, adjustable density controller 134 with a plurality of straps 136a, 136b may allow for greater control over the packing density. As discussed above, the density to which the material is packed in the bag is related to the amount of drag member surface area disposed between the packed material and the ground surface. Accordingly, the density may be adjusted by varying the width or the length of the drag member disposed under the packed material. Packing machine 10 may be used to pack a variety of materials and different packing densities may be desired for different materials. Because of the different physical properties of the materials to be packed, the different desired densities, and the other variables that affect material packing quality, a user may prefer to be able to control both the length and the width of the drag member.

The drag straps 136a, 136b provide a user with the ability to control the width of the surface area under pressure by adding or removing straps rather than replacing the drag member 36 for a different drag member having a different width. Additionally, the use of a plurality of straps may allow the user to customize the adjustable density controller 34 for use with bags of different diameters without requiring an assortment of differently sized drag members. For example, the movable frame 12 may be configured to carry four separately adjustable drag straps wherein the outermost drag straps are only extended for use with larger diameter bags or containers.

While FIG. 6 illustrates a plurality of drag straps used in connection a winch shaft, it should be understood that each of the plurality of drag straps may be operatively coupled to the packing machine in any of the manners discussed above. Additionally, the plurality of drag straps may be configured to be separately adjustable. Continuing with the example of FIG. 6 where the drag straps are coupled to a winch shaft, each strap may operatively coupled to a corresponding rotatable shaft that is rotatable independent of the other rotatable shafts. When other adjustable devices are used to vary the extended length of the drag straps, a plurality of such devices may be provided to allow separate and independent adjustment of the drag straps. It should be understood that the adjustable density controller may be provided with any number of drag straps and any number of adjustment devices to control the extended length of the straps. Each winch may be configured to control the length of one or more straps such that at least two of the drag straps are separately and selectively adjustable.

In operation, the separately adjustable drag straps may be used to control the direction in which the bag or container is extended. In the typical packing or bagging operation, the packing machine moves away from the closed end of the bag in a substantially linear path driven primarily by the force of the material packing into the bag. This causes the bag to form a substantially straight line in the direction in which the movable frame is headed as the bag is being filled. Such a bag can be seen in FIGS. 4 and 5.

However, many users of the packing machine 10 do not have the space available to serve as an ideal packing and storage location. The ground available for packing and storage may not be long enough for the long straight bags or the ground may be uneven or have obstacles in the desired bag path. In such circumstances, it may be desirable to have the bag turn a corner if the storage area is shorter than the desired bag length or to have the bag detour around an obstacle. For these and other reasons it may be desirable to vary the direction in which the bag or container is laid down while the bagging operation is proceeding.

An adjustable density controller having separately adjustable drag straps may facilitate the directional control of the bag while preserving packing density quality. Using an embodiment with two separately adjustable drag straps as an example, the bag may be caused to turn to the right by increasing the extended length of the drag strap on the right hand side of the adjustable density controller 234. Increasing the extended length of the drag strap on the right hand side will lead to increased resistance to the packing machine's forward progress on the right hand side while maintaining substantially the same resistance on the left hand side. The increased resistance on the right hand side will cause the left hand side to advance more quickly than the right hand side, which causes the movable frame and the bag to turn to the right. The same principles allow a turn to the left by increasing the extended length of the drag strap on the left hand side of the adjustable density controller 234.

The drag member 36 (and the flexible straps 136) has an upper surface 68 (168) and a lower surface 70 (170). The upper and lower surfaces of the drag member and the drag straps are discussed with reference to the drag member 36 but it is to be understood that the description applies to the drag straps as well. Upper surface 68 is disposed in facing relationship with the packed material. That is, the upper surface is the surface on which the packed material rests, either directly or with a bag or container disposed between the packed material and the drag member. Lower surface 70 of the drag member is disposed in facing relationship with the ground surface.

Figure 7:
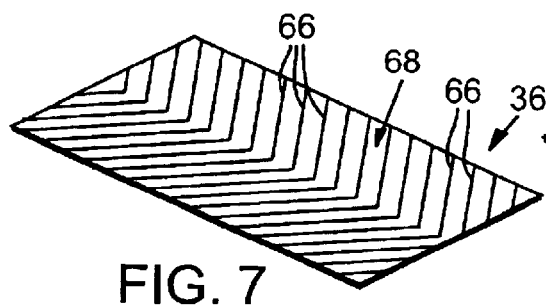
FIG. 7 is a perspective view of the upper surface of a drag member of an adjustable density controller illustrating a plurality of protuberances disposed thereon.

Drag member 36 may be configured with a plurality of protuberances 66 disposed on upper surface 68, as shown in FIG. 7. The plurality of protuberances on upper surface 68 may be configured to guide the bag or container material as the packing machine moves forward. Whether configured with or without the protuberances, drag member 36 may increase the usable length of the container. The weight of the packed material pressing the bag or container material against the upper surface 68 of drag member 36 may pull the bag or container material so that it is stretched tight. Pulling the container material may reduce the wrinkles in the bag, which, if present, may reduce the effective length of the bag. Additionally, when upper surface 68 is configured with a pattern of protuberances, the protuberances 66 may be configured to facilitate or maintain the cylindrical or semi-cylindrical configuration of the flexible, elongate material forming the container, which may be used as an alternative to a conventional bag. As discussed above, a cylindrical or semi-cylindrical container may be formed by tucking opposing side edges of an elongate material under the packed material. Once a portion of the elongate material is disposed between the packed material and the drag member 36, protuberances 66, angled inwardly as shown in FIG. 7, may direct the opposing side edges inwardly to retain the cylindrical or semi-cylindrical configuration of the container.

The weight of the packed material on drag member 36 as the machine 10 moves forward may also smooth uneven ground beneath drag member 36. The unevenness of the ground may be caused by wheel tracks, farming operations, packing operations, etc. Positioning the bag on even ground results in better bagging for a variety of reasons such as improved control over the packing density and consistency. Additionally, having the bag positioned on even ground facilitates the removal of the packed material from the bag because wrinkles, folds, and other inconsistencies that conform to uneven ground will not be present in the bottom of the bag.

The lower surface 70 of drag member 36 may be configured with a plurality of protuberances, bumps, or ridges to further enhance the smoothing effect of drag member 36 passing over the ground surface. The plurality of protuberances disposed on lower surface 70 can be in any configuration or arrangement desired. The protuberances, when present, are effective to disrupt the existing ground surface so that the weight of drag member 36 can smooth the ground.

Figure 8:
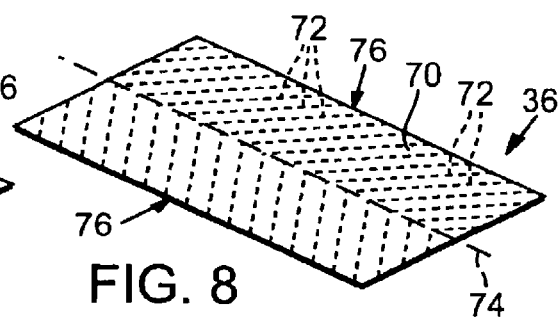
FIG. 8 is a perspective view of the lower surface of a drag member of an adjustable density controller illustrating a plurality of protuberances disposed thereon.

One configuration of the plurality of protuberances 72 is shown in FIG. 8. The protuberances 72 may be configured to form a series of V-shaped patterns on the lower surface with the point of each v-shaped pattern being position along the longitudinal centerline 74 of drag member 36 and the arms of each v-shaped pattern extending rearwardly toward the opposing side edges 76 of drag member 36.

Figure 9:
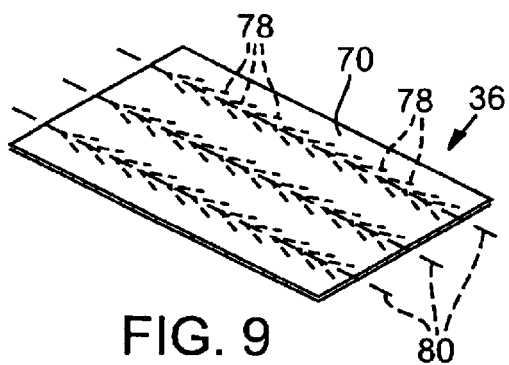
FIG. 9 is a perspective view of the lower surface of a drag member of an adjustable density controller illustrating an alternative configuration of the plurality of protuberances.
Figure 10:
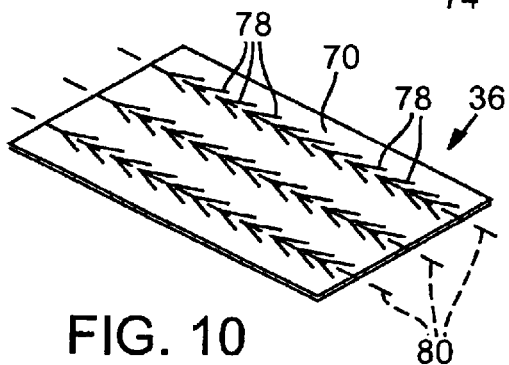
FIG. 10 is a perspective view of the lower surface of a drag member of an adjustable density controller illustrating an alternative configuration of the plurality of protuberances.

An alternative configuration of the protuberances on the lower surface 70 of drag member 36 is shown in FIG. 9. In this configuration, the protuberances are arranged to form a plurality of smaller v-shaped patterns 78 aligned along a plurality of longitudinal lines 80. FIG. 10 is distinguished from FIG. 9 in that the smaller v-shaped patterns 82 are formed by a continuous ridge rather than a plurality of bumps or protuberances as in FIG. 9.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

I claim:

1. A packing machine for packing material into a container, comprising:
   a movable frame having a rearward end and a forward end;
   a material-forming enclosure having an intake end coupled to the rearward end of the movable frame and configured to receive the material to be packed, and an output end extending rearwardly away from the movable frame and configured to receive the container;
   a material-filling apparatus coupled to the movable frame and configured to move the material to be packed rearwardly into the material-forming enclosure and to pack the material into the container, wherein the packaging machine is adapted to move forwardly as the material is packed into the container; and
   at least one drag member operatively coupled to the packing machine to extend rearwardly with respect to the frame to resist forward movement of the packing machine, wherein the at least one drag member is at least substantially flat having an adjustable operative surface area and having an upper surface and a lower surface, wherein the upper surface is in contact with at least one of the container and the packed material and is facing substantially all of the packed material disposed along the operative surface area thereof, and wherein at least a portion of the lower surface contacts a ground surface on which the packed material rests.

2. The packing machine of claim 1, wherein at least a portion of the container is disposed between the packed material and the drag member.

3. The packing machine of claim 1, wherein the container is an elongate covering having opposing side edges, wherein during operation the elongate covering is formed into a semi-cylindrical shape by disposing the opposing side edges adjacent the material-forming enclosure between the packed material and the drag member, and wherein the opposing side edges are configured to remain tucked under the packed material as the packing machine moves forward.

4. The packing machine of claim 1, wherein the at least one drag member has a fixed member length and an adjustable extended length.

5. The packing machine of claim 4, wherein the at least one drag member is wound upon a selectively rotatable winch, and wherein the extended length of the drag member is adjustably controlled by selective rotation of the winch.

6. The packing machine of claim 1, wherein the drag member comprises two or more drag straps each having a strap length.

7. The packing machine of claim 6, wherein the two or more drag straps each have an adjustable extended length.

8. The packing machine of claim 7, wherein the two or more drag straps are wound upon a selectively rotatable winch, and wherein the extended lengths of the two or more drag straps are adjustably controlled by selective rotation of the winch.

9. The packing machine of claim 7, wherein the extended lengths of at least two of the two or more drag straps are separately and selectively adjustable.

10. The packing machine of claim 9, wherein at least two of the two or more flexible straps are wound upon corresponding, separately and selectively rotatable winches, and wherein the extended lengths of at least two straps are separately and adjustably controlled by selective rotation of the strap's corresponding winch.

11. The packing machine of claim 1, wherein the lower surface of the at least one drag member smoothes the ground surface over which the drag member passes as the packing machine moves forward.

12. The packing machine of claim 11, wherein a plurality of protuberances are disposed on at least one of the lower surface of the drag member and the upper surface of the drag member.

13. The packing machine of claim 12, wherein a plurality of protuberances are disposed on the lower surface to form one or more v-shaped patterns on the lower surface of the drag member.

14. The packing machine of claim 12, wherein a plurality of protuberances are disposed on the lower surface and wherein each of the plurality of protuberances on the lower surface are configured as v-shaped ridges having a point and two, rearwardly-extending, diverging arms.

15. The packing machine of claim 12, wherein a plurality of protuberances are disposed on the upper surface to guide the container as the packing machine moves forward.

16. The packing machine of claim 1, wherein the at least one drag member extends downwardly as well as rearwardly with respect to the frame.

17. A density controller for use in cooperation with a packing machine that is adapted to move forwardly as it packs material into a container, the density controller comprising:

a material-forming enclosure having an intake end configured to couple to a packing machine and configured to receive material to be packed, and an output end extending rearwardly away from the packing machine above a around surface and configured to receive a container; and at least one drag member operatively coupled to the material-forming enclosure configured to extend rearwardly from the coupling to the material-forming enclosure to resist forward movement of the packing machine; wherein the at least one drag member is at least substantially flat having an adjustable operative surface area and having an upper surface and a lower surface, wherein the upper surface is in contact with at least one of the container and the packed material; and wherein at least a portion the lower surface is in contact with a ground surface on which the packed material rests.

18. The density controller of claim 17, wherein at least a portion of the container is disposed between the packed material and the drag member.

19. The density controller of claim 17, wherein the at least one drag member has a fixed member length and an adjustable extended length.

20. The density controller of claim 19, wherein the at least one drag member is wound upon a selectively rotatable winch, and wherein the extended length of at least one of the at least one drag member is adjustably controlled by selective rotation of the winch.

21. The density controller of claim 17, wherein the drag member comprises two or more drag straps each having a strap length.

22. The density controller of claim 21, wherein the two or more drag straps each have an adjustable extended length.

23. The density controller of claim 22, wherein the two or more drag straps are wound upon a selectively rotatable winch, and wherein the extended lengths of the two or more drag straps are adjustably controlled by selective rotation of the winch.

24. The density controller of claim 22, wherein the extended lengths of at least two of the two or more drag straps are separately and selectively adjustable.

25. The density controller of claim 24, wherein at least two of the two or more flexible straps are wound upon corresponding, separately and selectively rotatable winches, and wherein the extended lengths of at least two straps are separately and adjustably controlled by selective rotation of the strap's corresponding winch.

26. The density controller of claim 17, wherein the lower surface of the least one drag member smoothes the ground surface beneath the packed material over which the drag member passes as the packing machine moves forward.

27. The density controller of claim 26, wherein a plurality of protuberances are disposed on at least one of the lower surface of the at least one drag member and the upper surface of the at least one drag member.

28. The density controller of claim 27, wherein a plurality of protuberances are disposed on the lower surface wherein a plurality of protuberances are disposed on the lower surface to form one or more v-shaped patterns on the lower surface of the drag member.

29. The density controller of claim 28, wherein a plurality of protuberances are disposed on the lower surface and wherein each of the plurality of protuberances on the lower surface are configured as v-shaped ridges having a point and two, rearwardly-extending, diverging arms.

30. The density controller of claim 27, wherein a plurality of protuberances are disposed on the upper surface to guide the container as the packing machine moves forward.

31. A method of packing material into a container, comprising:

providing a packing machine adapted to move forwardly as material is packed into a container, the packing machine including a movable frame having a rearward end and a forward end, a material-forming enclosure having an intake end coupled to the rearward end of the movable frame which receives the material to be packed, and an output end extending rearwardly from the movable frame which receives the container, a material-filling apparatus coupled to the movable frame and configured to move the material into and through the material-forming enclosure and to pack the material into the container, and at least one substantially flat drag member operatively coupled to the packing machine and extending rearwardly with respect to said frame to resist forward movement of the packing machine, wherein the at least one drag member has an operative surface area and has an upper surface and a lower surface;

operating said material-filling apparatus to move material through said material-forming enclosure into said container, wherein the upper surface of the at least one drag member is in contact with at least one of the container and the packed material and is facing substantially all of the packed material disposed alone the operative length thereof, and wherein the lower surface of the least one drag member contacts a ground surface on which the packed material rests; and controlling the density of the material packed into said container by varying the surface area of the at least one drag member beneath the packed material.

32. The method of claim 31, wherein at least a portion of the container is disposed between the packed material and the at least one drag member.

33. The method of claim 31, wherein the at least one drag member comprises two or more drag straps each having a fixed strap length and an adjustable extended length; wherein at least two of the drag straps are in operative association with the ground surface and are separately and selectively adjustable; and wherein the method further comprises steering the packed container by varying the extended length of at least two of the drag straps beneath the packed material.

34. The method of claim 33, wherein at least two of the drag straps are wound upon corresponding, separately and selectively rotatable winches, and wherein the extended lengths of at least two of the drag straps are separately and adjustably controlled by selective rotation of the strap's corresponding winch.

35. The method of claim 31, wherein the method further comprises smoothing the ground over which the drag member passes as the packing machine moves forward.

36. A packing machine for packing material into a container, comprising:

a movable frame having a rearward end and a forward end;

a material-forming enclosure having an intake end coupled to the rearward end of the movable frame and configured to receive the material to be packed and an output end extending rearwardly away from the movable frame and configured to receive the container;

a material-filling apparatus coupled to the movable frame and configured to move the material to be packed rearwardly into the material-forming enclosure and to pack the material into the container, wherein the packing machine is adapted to move forwardly as the material is packed into the container; and drag means extending rearwardly from the frame for resisting forward movement of the packing machine, wherein the drag means is at least substantially flat having an adjustable operative surface area and having an upper surface and a lower surface, wherein the upper surface is in contact with at least one of the container and the packed material, and wherein the lower surface contacts a ground surface on which the packed material rests.

37. A packing machine for packing material into a container, comprising:

a movable frame having a rearward end and a forward end;

a material-forming enclosure having an intake end coupled to the rearward end of the movable frame and configured to receive the material to be packed and an output end extending rearwardly away from the movable frame and configured to receive the container;

a material-filling apparatus coupled to the movable frame and configured to move the material to be packed rearwardly into the material-forming enclosure and to pack the material into the container, wherein the packing machine is adapted to move forwardly as the material is packed into the container; and drag means extending downwardly and rearwardly from the frame for resisting forward movement of the packing machine, wherein the drag means has an adjustable operative surface area is at least substantially flat and that has an upper surface and a lower surface, wherein the upper surface is in frictional communication with at least one of the container and the packed material and is facing substantially all of the packed material disposed along the operative length thereof, and wherein the lower surface contacts a ground surface on which the packed material rests.

38. A bagging machine for bagging material into a bag having a fixed end and an open mouth, comprising:

a movable frame having rearward and forward ends;

a material forming enclosure having an intake end which receives the material to be bagged and an output end which receives the open mouth of the bag, said material forming enclosure having an upper end and a lower end;

a material filling apparatus on said frame said material filling apparatus moving the material to be bagged rearwardly into said material forming enclosure and into the bag;

and a flexible sheet member having one end operatively secured to said frame and an unattached free end extending rearwardly with respect to said frame beneath the bag between the filled bag and the ground to resist the movement of the bagging machine away from the fixed end of the bag.

39. The bagging machine of claim 38 wherein said sheet member has a length and a width and wherein said length is adjustable controlled.

40. The bagging machine of claim 38 wherein said sheet member comprises a belt material.

41. The bagging machine of claim 38 wherein said sheet material is wound upon a selectively rotatable member.

42. The bagging machine of claim 41 wherein said selectively rotatable member controls the length of said sheet member which is positioned beneath the filled bag.

43. The bagging machine of claim 38 wherein said sheet member has a width which is approximately four to eight feet.

44. The bagging machine of claim 38 wherein said sheet member has a width at least as great as four feet.

45. The bagging machine of claim 41 wherein a reversible motor is connected to said selectively rotatable member.

46. The bagging machine of claim 41 wherein said selectively rotatable member is selectively reversible.

47. The bagging machine of claim 45 wherein said reversible motor comprises a hydraulic motor.

48. The bagging machine of claim 47 wherein a hydraulic pressure gauge is operatively fluidly connected to said hydraulic motor to provide the operator with a measurement of the amount of back pressure being exerted on said hydraulic motor by said flexible sheet member as it is being pulled from beneath the bag during the filling process.

49. A bagging machine for packing material into a container having a closed fixed end and an open end, comprising:

a movable frame having rearward and forward ends;

a material forming enclosure having an intake end which receives the material to be packed and an output end which receives the open mouth of the container; said material forming enclosure having an upper end and a lower end;

a material packing apparatus on said frame; said material packing apparatus moving the material to be packed rearwardly into said material forming enclosure and into the container;

and a flexible member having one end operatively secured to said frame and an unattached free end extending rearwardly with respect to said frame beneath the container between the packed container and the ground to resist the movement of the machine away from the fixed end of the container.

50. The machine of claim 49 wherein said flexible member has a length and a width and wherein said length is adjustable controlled.

51. The machine of claim 49 wherein said flexible member comprises a belt material.

52. The machine of claim 49 wherein said flexible material is wound upon a selectively rotatable member.

53. The machine of claim 51 wherein said selectively rotatable member controls the length of said flexible member which is positioned beneath the packed container.

54. The machine of claim 49 wherein said flexible member has a width which is approximately four to eight feet.

55. The machine of claim 49 wherein said flexible width at least as great as four feet.

56. The machine of claim 52 wherein a reversible motor is connected to said selectively rotatable member.

57. The machine of claim 52 wherein said selectively rotatable member is selectively reversible.

58. The machine of claim 56 wherein said reversible motor comprises a hydraulic motor.

59. The machine of claim 58 wherein a hydraulic pressure gauge is operatively fluidly connected to said hydraulic motor to provide the operator with a measurement of the amount of back pressure being exerted on said hydraulic motor by said flexible member as it is being pulled from beneath the container during the packing process.

60. The method of bagging material into a bag having a closed end and an open mouth, comprising the steps of:

providing a bagging machine including a movable frame having a rearward end and a forward end, a material forming enclosure having an intake end which receives the material to be bagged and an output end which receives the open mouth of the bag, a material filling apparatus on said frame for forcing the material into and through said material forming enclosure and into said bag, and a flexible sheet member having one end operatively secured to said frame and an unattached free end extending rearwardly with respect to said frame beneath the bag between the filled bag and the ground to resist the movement of the bagging machine away from the fixed end of the bag;

operating said material filling apparatus to force material through said material forming enclosure into said bag;

and controlling the density of the material placed into said bag by varying the distance which said flexible sheet member extends beneath the filling bag.

61. The method of claim 60 wherein said bag is stretched during the bagging operation.

* * * * *